(12) United States Patent
Marapane et al.

(10) Patent No.: US 6,707,929 B2
(45) Date of Patent: Mar. 16, 2004

(54) METHOD FOR ANALYZING HAIR AND PREDICTING ACHIEVABLE HAIR DYEING ENDING COLORS

(75) Inventors: Suresh Bandara Marapane, West Chester, OH (US); Ke Ming Quan, West Chester, OH (US); David Walter, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 228 days.

(21) Appl. No.: 09/844,585

(22) Filed: Apr. 27, 2001

(65) Prior Publication Data

US 2002/0010556 A1 Jan. 24, 2002

Related U.S. Application Data

(63) Continuation-in-part of application No. 09/570,292, filed on May 12, 2000, now abandoned.

(51) Int. Cl.[7] .................................................. G06K 9/00
(52) U.S. Cl. ....................................... 382/100; 382/162
(58) Field of Search ............................... 382/162, 167, 382/100; 358/518; 434/377; 702/22; 132/202, 208; 424/70.6; D28/20; 356/402, 425

(56) References Cited

U.S. PATENT DOCUMENTS

| | | | |
|---|---|---|---|
| 4,258,478 A | * 3/1981 | Scott et al. | 434/94 |
| 4,434,467 A | * 2/1984 | Scott | 700/90 |
| 4,583,562 A | * 4/1986 | Stewart | 132/212 |
| 4,813,000 A | 3/1989 | Wyman et al. | |
| 4,872,056 A | * 10/1989 | Hicks et al. | 348/584 |
| 4,911,544 A | 3/1990 | Walsh | |
| 4,977,522 A | 12/1990 | David | |
| 5,003,500 A | 3/1991 | Gerber | |
| 5,060,171 A | * 10/1991 | Steir et al. | 345/630 |
| 5,163,010 A | 11/1992 | Klein et al. | |
| 5,404,426 A | * 4/1995 | Usami et al. | 345/420 |
| 5,622,692 A | 4/1997 | Rigg et al. | |
| 5,785,960 A | 7/1998 | Rigg et al. | |
| 5,793,501 A | * 8/1998 | Murakami | 358/520 |

(List continued on next page.)

FOREIGN PATENT DOCUMENTS

| | | | |
|---|---|---|---|
| EP | 0 290 327 A1 | 11/1988 | |
| FR | 2429462 A | * 2/1980 | A45D/19/00 |

(List continued on next page.)

OTHER PUBLICATIONS

Roy S. Berns, Billmeyer and Saltzman's Principles of Color Technology, 2000, John Wiley & Sons, Inc, Third Edition, pp. 66–70.*

(List continued on next page.)

Primary Examiner—Bhavesh M. Mehta
Assistant Examiner—Christopher Sukhaphadhana
(74) Attorney, Agent, or Firm—Marianne Dressman; Jack L. Oney (57) ABSTRACT

Method and system for analyzing hair, predicting achievable end colors and recommending hair color agents based on recipient specific input. Includes methods for (a) identifying an achievable end hair color based upon at least one starting hair value of a recipient; (b) for identifying a hair coloring agent based upon at least one starting hair value of a recipient; and (c) for outputting an image for a hair color analyzing system. Also includes (d) a method for providing a hair coloring product to a consumer comprising the steps of: (i) identifying achievable end hair colors for the consumer, (ii) depicting the achievable end colors to the consumer, (iii) allowing the consumer to select a desired end hair color, and (iv) recommending to the consumer a hair coloring agent to achieve said desired end hair color.

12 Claims, 10 Drawing Sheets

U.S. PATENT DOCUMENTS

| | | | |
|---|---|---|---|
| 5,945,112 A | | 8/1999 | Flynn et al. |
| 5,953,703 A | | 9/1999 | Takeuchi et al. |
| 6,067,504 A | | 5/2000 | MacFarlane et al. |
| 6,314,372 B1 | * | 11/2001 | Macfarlane et al. .......... 702/22 |
| 6,330,341 B1 | * | 12/2001 | Macfarlane et al. ........ 382/100 |
| 6,362,849 B1 | * | 3/2002 | Caisey-Bluteau et al. . 348/222.1 |
| 6,389,150 B1 | * | 5/2002 | Amornsiripanitch ........ 382/100 |
| 6,437,863 B1 | * | 8/2002 | Macfarlane et al. ..... 356/243.5 |
| 6,459,436 B1 | * | 10/2002 | Kumada et al. ............ 345/590 |
| 2001/0017627 A1 | * | 8/2001 | Marsden et al. ............ 345/501 |

FOREIGN PATENT DOCUMENTS

| | | |
|---|---|---|
| JP | 5025020 A2 | 2/1993 |
| JP | 7174631 A2 | 7/1995 |
| JP | 9178560 A2 | 7/1997 |
| JP | 10240920 A2 | 9/1998 |
| JP | 11328401 A2 | 11/1999 |
| JP | 2000-193527 A2 | 7/2000 |
| JP | 2000-205959 A | 7/2000 |
| WO | 91/14158 A1 | 9/1991 |
| WO | 95/05892 A1 | 3/1995 |
| WO | 96/41139 A1 | 12/1996 |
| WO | 99/31472 A1 | 6/1999 |

OTHER PUBLICATIONS

Kimberly Pokalsey, Should I dye or color my hair?, 2001, http://fl.essortment.com/dyecolorhair_rgys.htm, pp. 1–2.*

"Hair Color Ideas and Tips", Walter Claudio Salon Spa, http://www.walterclaudio.com/color_tips.html, pp. 1–3.*

Park Moo–jong, Why Hair Dye?, The Korea Times [Times Colloquy], Nov. 27, 2001, http://www.hankooki.com/kt_op/200111/t2001112716495848110.htm, pp. 1–4.*

Chris Rovney, Hair Coloring 101, 2000, http://www.askmen.com/fashion/fashiontip_60/86b_fashion_advice.html, pp. 1–3.*

"Kao begins over–the–counter selling of the hair color 'Burone'—You can check your dyed hair [color] on a screen," Nikkei Ryutsu Newspaper, Feb. 10, 2000, p. 3, (translation).

"You can see the best hair color for you —Kao offers picture image." Nikkei Sangyo newspaper article, Jan. 21, 2000, p. 15.

"Kao develops hair color finish image system. It will support store sales." Nikkan Kogyo newspaper article, Jan. 21, 2000, p. 27.

*Cosmetics & Toiletries* magazine article, Apr. 2000, pp. 76–77.

* cited by examiner

| Family of Colors | | | | | | |
|---|---|---|---|---|---|---|
| Red / Copper | Light Brown | Med Brown | Dark Brown | Blonde | Shades | change or enhance? |
| x | | | | | Auburn | e |
| x | x | | | | Light Mahogany Brown | e |
| | x | | | | Light Brown | e |
| x | x | | | | Light Chestnut Brown | e |
| | | | x | | Dark Brown | e |
| x | | x | | | Mid Copper Brown | e |
| | | | | x | Light Pearl Ash Blonde | c |
| | | | | x | Mist Beige Blonde | c |
| x | | | | | Rich Burgundy Red | c |
| x | x | | | | Light Auburn Brown | c |
| | x | | | | Lightest Brown | c |
| | x | | | | Lightest Golden Brown | c |
| | | x | | | Soft Medium Brown | c |
| x | | | | | True Red | c |
| | | | x | | Warm Dark Brown | c |
| x | | | | x | Soft Copper Blonde | c |

Fig. 10

PRIOR ART – COLOR CHART ON EXISTING PACKAGING

| person | Position on head | Before coloring | | | After coloring | | |
|---|---|---|---|---|---|---|---|
| | | L | A | b | L | a | b |
| 1 | front | 23.21 | 2.26 | 3.39 | 22.85 | 3.95 | 3.75 |
| 1 | front left | 22.61 | 2.58 | 4.00 | 20.74 | 4.25 | 4.28 |
| 1 | back left | 22.08 | 2.54 | 3.44 | 20.85 | 3.71 | 3.74 |
| 1 | back | 23.73 | 2.86 | 4.34 | 22.84 | 2.95 | 4.45 |
| 1 | back right | 21.62 | 2.62 | 3.71 | 20.65 | 3.92 | 3.23 |
| 1 | front right | 22.15 | 2.50 | 3.91 | 19.6 | 4.62 | 3.65 |
| 1 | average | 22.57 | 2.56 | 3.80 | 21.26 | 3.90 | 3.85 |

METHOD FOR ANALYZING HAIR AND PREDICTING ACHIEVABLE HAIR DYEING ENDING COLORS

CROSS-REFERENCE TO RELATED APPLICATIONS

This application is a continuation-in-part (CIP) of U.S. Ser. No. 09/570,292, filed on May 12, 2000, now abandoned.

TECHNICAL FIELD OF THE INVENTION

The present invention relates in general to a method and system for analyzing hair, predicting achievable end colors, outputting the predicted achievable colors and recommending hair color agents based on recipient specific input.

BACKGROUND OF THE INVENTION

Countless individuals all over the world seek to improve their physical appearance through the use of hair coloring agents. As a result there is an extremely large choice of available products for consumers to choose from. Often, the individual consumer finds it difficult to determine which hair coloring agent to choose and also predict what it will look like given their current hair color.

Some hair coloring agents are sold in packaging which depicts a coloring chart usually containing three starting colors and three corresponding ending colors after dyeing. Some systems have been developed that attempt to overlay pictures of hair colors over a picture of the consumer. Other systems attempt to match products to starting colors using an indexing system. However, none of these systems provide a personalized color prediction based on a starting hair value (such as color) of the recipient in a manner which is not limited by a specific number of inputs. As such, consumers may not achieve an ending hair color which is reasonably close to the promised hair color. Furthermore, none of the systems are made integral in the purchasing experience by synergistically combining a hair color analyzing system with a product line of hair coloring agents.

What is needed is a method and system to analyze hair, predict achievable end colors, output the predicted achievable colors and recommend hair color agents based on recipient specific input.

SUMMARY OF THE INVENTION

The present invention is directed to a method and system for analyzing hair, predicting achievable end colors and recommending hair color agents based on recipient specific input.

In one aspect, the invention is directed to a method for identifying an achievable end hair color based upon at least one starting hair value of a recipient. This method includes the steps of inputting at least one starting hair value of a recipient and then identifying at least one achievable end hair color based upon the starting hair value.

In another aspect, the invention is directed to a method for identifying a hair coloring agent based upon at least one starting hair value of a recipient. This method includes the steps of inputting at least one starting hair value of a recipient, inputting a family color selection, and outputting at least one working image depicting an achievable end hair color based upon the starting hair value and the family color selection. This method may also include one or more steps to enhance the appearance of the outputted working image to account for any differences between the characteristics of the lighting under which the starting hair value is obtained versus the lighting under which the working image is viewed.

In yet another aspect, the invention is directed to a method for outputting an image for a hair color analyzing system including the steps of inputting a working image of a person; inputting an achievable end hair color; converting RGB color values of the working image to L, a, and b color values; computing averaged L, a, and b color values of the working image; computing new L, a, and b color values based on the working image L, a, and b color values, the working image averaged L, a, and b color values and the achievable end hair color; and then converting the new L, a, and b color values to RGB values.

In still yet another aspect, the invention is directed to a method for providing a hair coloring product to a consumer comprising the steps of identifying achievable end hair colors for the consumer, depicting the achievable end colors to the consumer, allowing the consumer to select a desired end hair color, and recommending to the consumer a hair coloring agent to achieve said desired end hair color.

These and other features and advantages of the present invention will be apparent to those skilled in the art in view of the detailed description provided below.

DETAILED DESCRIPTION OF THE INVENTION

Figure 1:
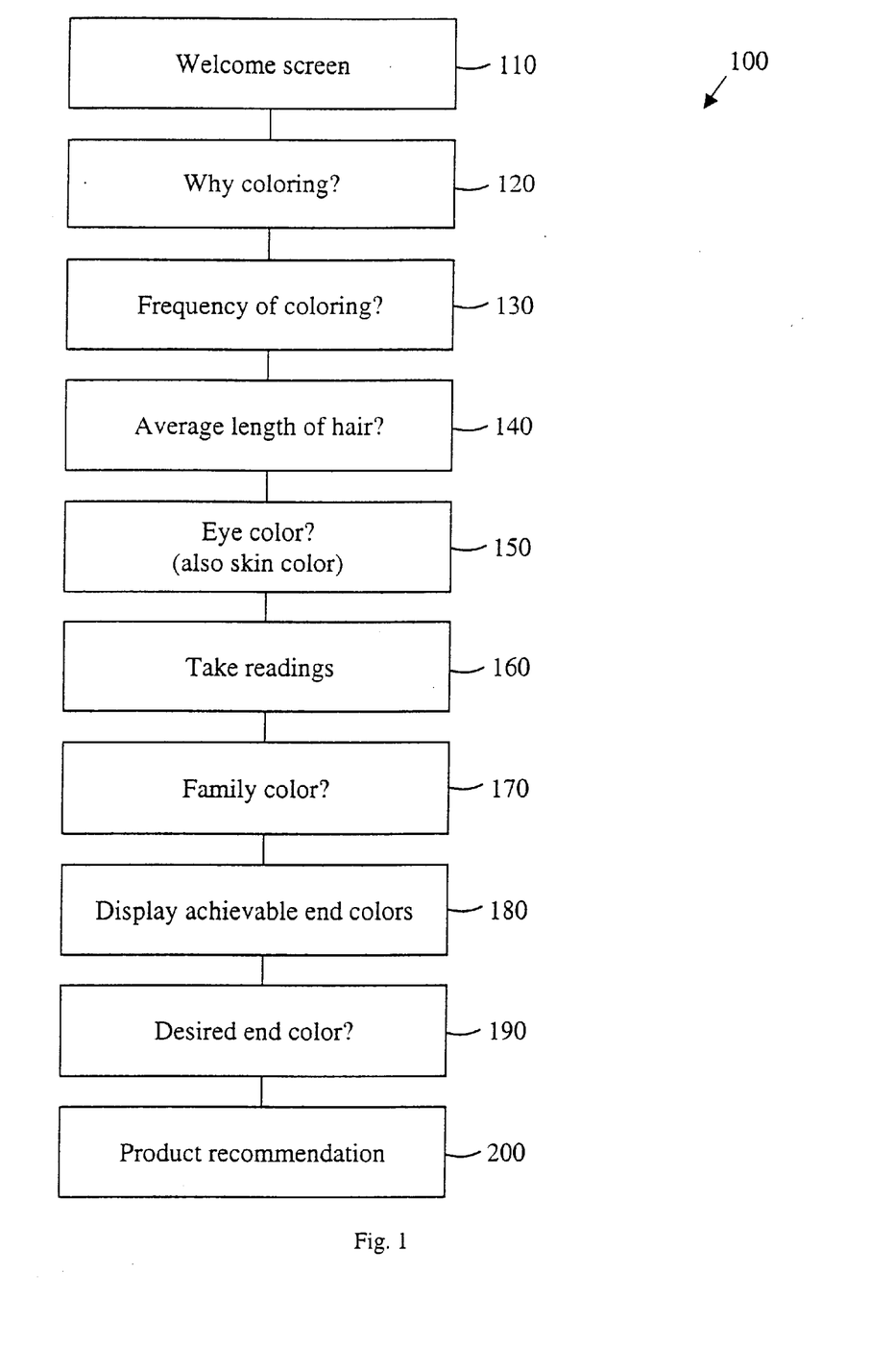
FIG. 1 is a block diagram of a color prediction method capable of utilizing the present invention.

A block diagram of a method 100 for identifying a hair coloring agent based upon starting hair conditions of a recipient is illustrated in FIG. 1. In one embodiment, method 100 is embodied in a computer system and is located at a retail counter for the purpose of analyzing and recommending hair coloring products. However, persons of skilled in the art would readily appreciate that the apparatus may be used anywhere without departing from the scope of the present invention. For example, the apparatus could be used in a salon.

Figure 2:
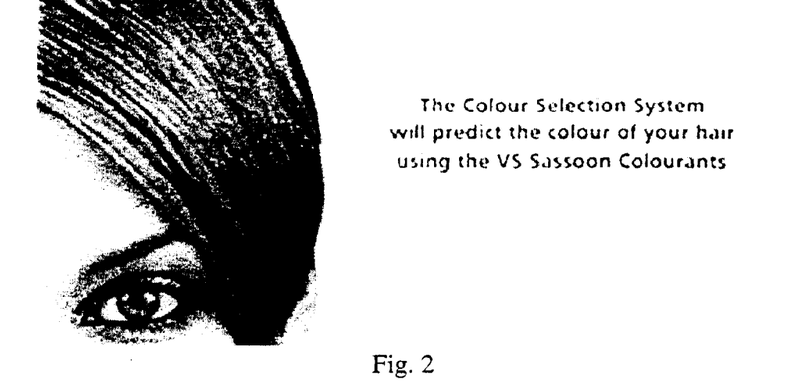
FIG. 2 is a screen shot of a welcoming screen which may be used and is an example of block 110 within FIG. 1.
Figure 3:
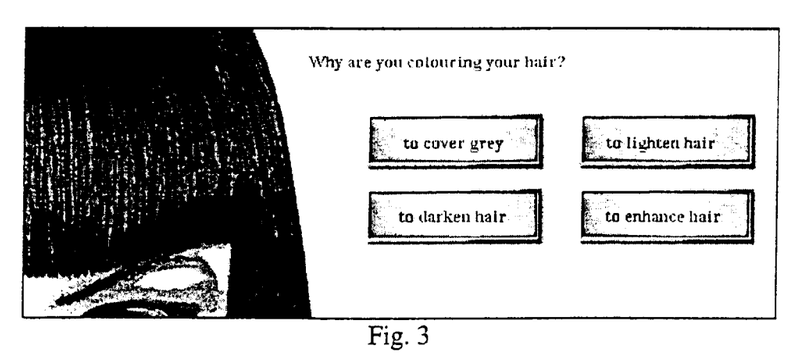
FIG. 3 is a screen shot of an input screen which may be used and is an example of block 120 within FIG. 1.
Figure 4:
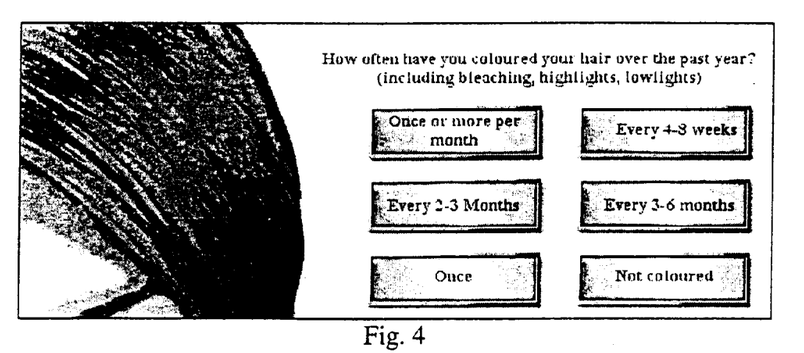
FIG. 4 is a screen shot of an input screen which may be used and is an example of block 130 within FIG. 1.
Figure 5:
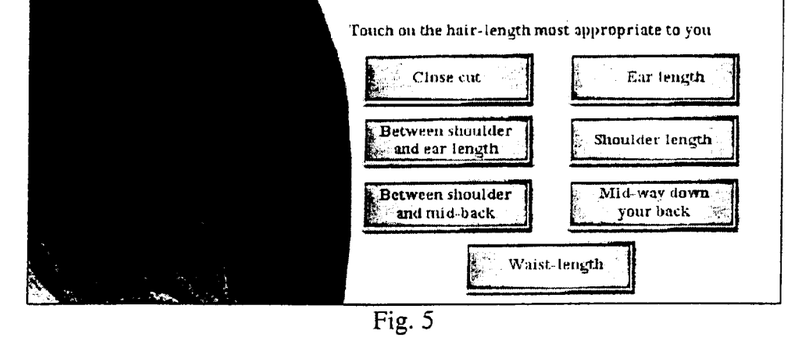
FIG. 5 is a screen shot of an input screen which may be used and is an example of block 140 within FIG. 1.
Figure 6:
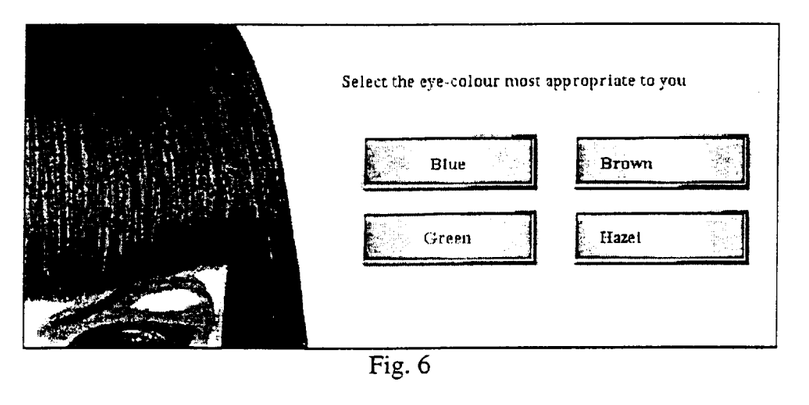
FIG. 6 is a screen shot of an input screen which may be used and is an example of block 150 within FIG. 1.

Referring to FIG. 1, hair color analyzing method 100 contains a series of steps which contain screen shots that are intended to give and receive information to a recipient or user for purposes of executing this method 100. These screen shots may be displayed on a display screen, which may include, but is not limited to: a computer screen, a cathode ray tube (CRT) device, and a liquid crystal display (LCD) device. Block 110 contains a welcoming screen (see FIG. 2) which identifies the system and the associated hair color agents (e.g. VS Sassoon products). Block 120 contains a screen which asks the recipient why he/she is coloring his/her hair (see FIG. 3). For instance, one recipient may want to cover his gray hair which requires a stronger hair coloring agent, while another recipient may only want to enhance her hair color which requires a milder hair coloring agent. Block 130 contains a screen which asks the recipient how often he/she has colored their hair over the past year (see FIG. 4). The frequency to which someone colors their hair may affect their hair's condition and ability to receive another coloring. Block 140 contains a screen which asks the recipient what is the average length of their hair (see FIG. 5). The length of a recipient's hair may affect the hair's condition and ability to receive another coloring as the longer the hair, the more weathered it becomes. It may also affect how the color measurements are to be taken (e.g. skew the modeling to more heavily consider the roots versus the ends). Block 150 contains a screen which asks the recipient what is their eye (and/or skin) color. (see FIG. 6). The eye and skin color information may be depicted within the rendered images that the recipient looks at in determining their desired end color and therefore assist in the recipients selection process.

Figure 7:
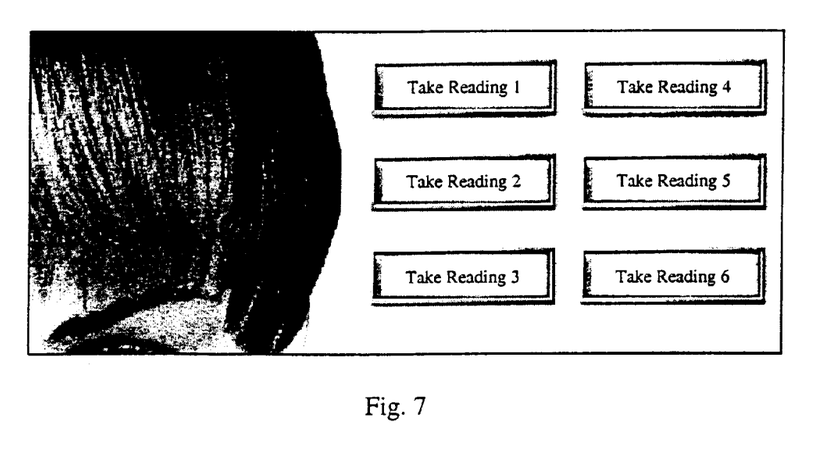
FIG. 7 is a screen shot of an input screen which may be used and is an example of block 160 within FIG. 1.
Figure 8:
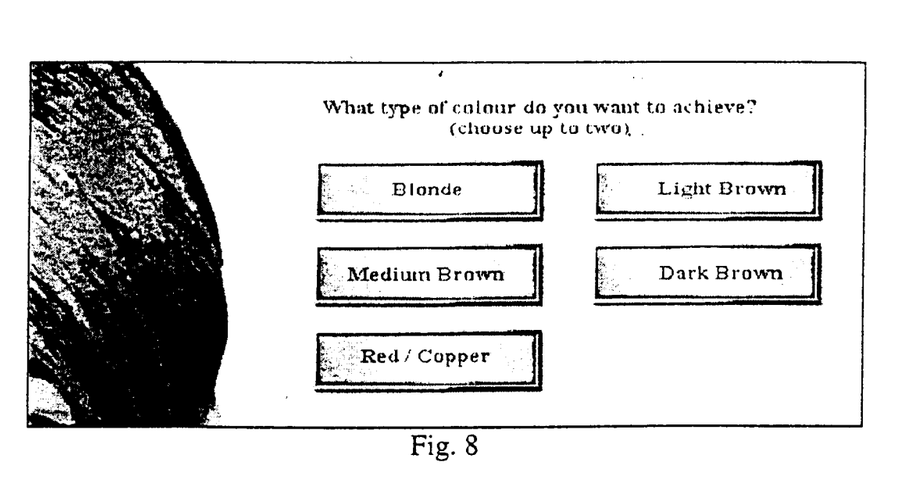
FIG. 8 is a screen shot of an input screen which may be used and is an example of block 170 within FIG. 1.

Still referring to FIG. 1, block 160 prompts the recipient to take a plurality of color measurements of their hair using a calorimeter or spectrophotometer (see FIG. 7). In one embodiment, the recipient is prompted to take six color readings (front, front left, back left, back, back right and front right). This may be performed by the recipient themselves, or it may be performed on the recipient by another, for example a beauty counselor. Each reading from the calorimeter will be in a useable format, including, but not limited to Commission International de l'Eclairage (CIE) L, a, b color values, and Hunter L, a, b color values. Persons skilled in the art would readily appreciate that other color formats may be used without departing from the scope of the present invention. Next, these L, a, b color values are averaged and stored for use later in the color prediction model. It will be apparent to those skilled in the art that a statistical analysis may be performed on the plurality of L, a, and b values, respectively, to correct for abnormalities and inaccuracies and errors which may occur during measurement. Block 170 prompts the recipient to choose from a family of colors (e.g. Blonde, Light Brown, Medium Brown, Dark Brown and Red/Copper) (see FIG. 8). The selected color family is also used in the color prediction model. While the preferred embodiment depicts five different color families, persons skilled in the art would readily appreciate that any number of color families may be used anywhere without departing from the scope of the present invention. Further, it will be appreciated by those skilled in the art that the order in which the steps set forth in blocks 120 through 170 are shown herein represent but one embodiment of the present invention, and that these steps may actually be performed in any order relative to one another.

Figure 9:
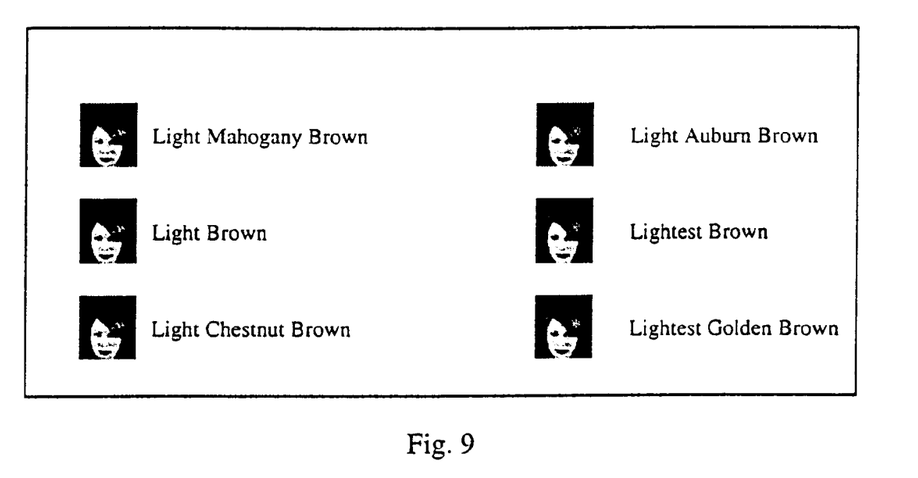
FIG. 9 is a screen shot of an input screen which may be used and is an example of block 180 and block 190 within FIG. 1.
Figure 10:
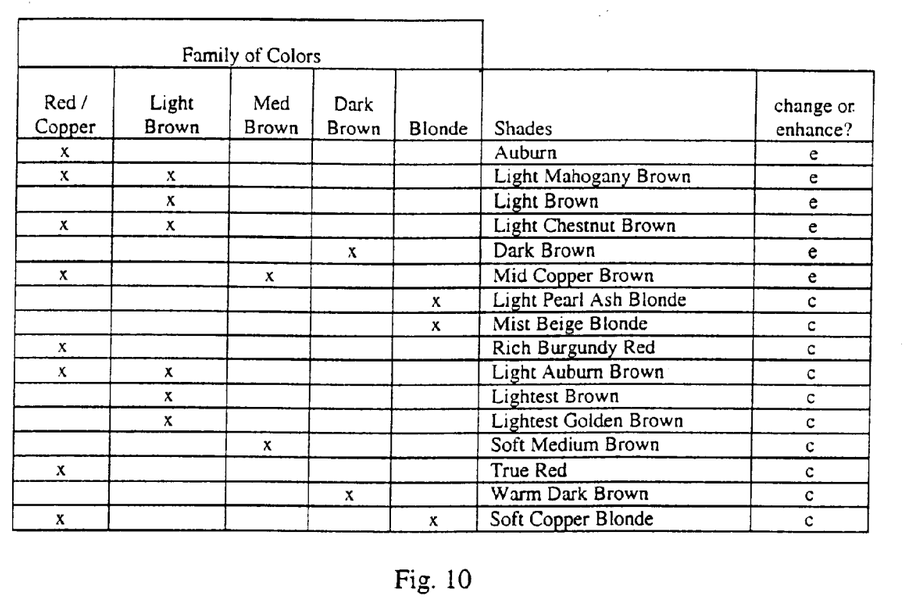
FIG. 10 is a table of family colors and corresponding shades of colors.
Figure 11:
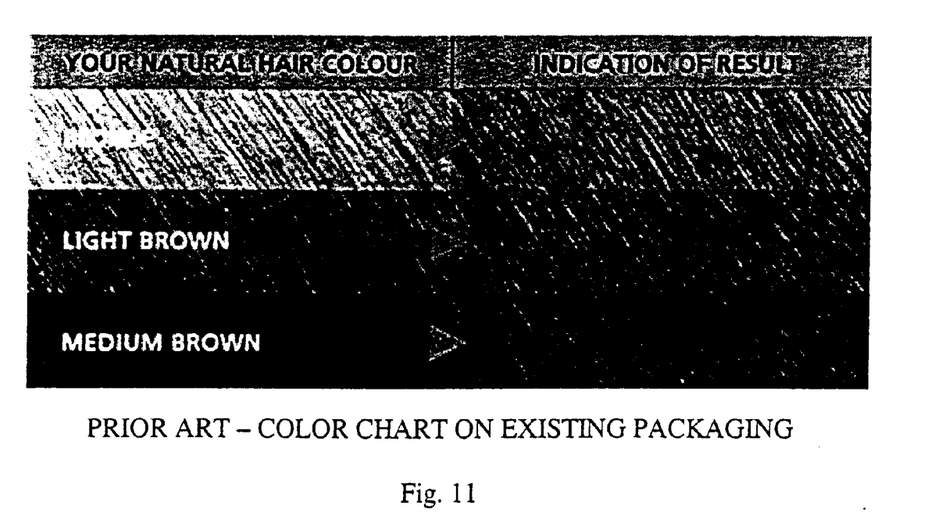
FIG. 11 is an example of a hair coloring chart within the prior art.
Figure 12:
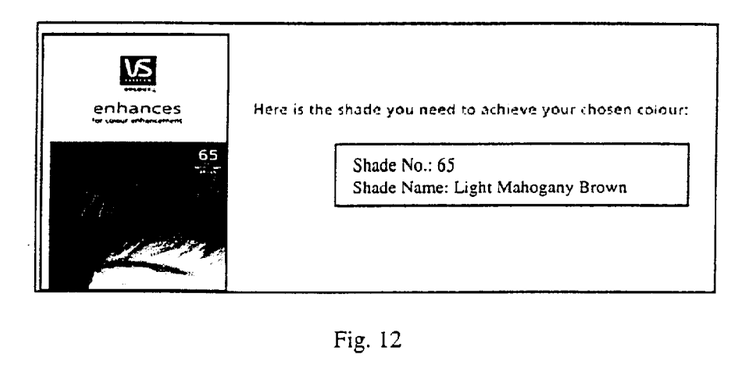
FIG. 12 is a screen shot of an output screen which may be used and is an example of block 200 within FIG. 1.

Block 180 displays achievable end hair colors which have been determined based on the input from the steps described in blocks 120 through 170 (see FIG. 9). Block 190 prompts the recipient to select from a group of achievable end hair colors which represent various color shades contained within the family color selected in the step described in block 170 (see FIG. 9). It is contemplated that prompts may be presented to the recipient which allow the recipient to go backwards in the flow of the method to arrive at a different combination of achievable end hair colors to be displayed in block 180. As non-limiting examples, this may allow the recipient to change inputted values, including answers to questions, or it may allow the recipient to simply indicate that they want to look at a lighter or darker or redder or less red or blonder or less blonder set of end hair colors. The achievable end hair colors may be separated into multiple categories, including but not limited to, changes versus enhances wherein those colors within the changes category are considered a more extreme change in color requiring a higher pH hair coloring agent and those colors in the enhance category are considered milder change in color requiring a lower pH hair coloring agent. Such information regarding the category (e.g. pH level of hair coloring agent) may assist the recipient and/or beauty counselor in making more informed decisions as to which hair coloring agent to use. While the preferred embodiment contains sixteen different color shades with the five different color families (see FIG. 10), those skilled in the art would readily appreciate that any number of color shades may be used anywhere without departing from the scope of the present invention. For example, twenty-five color shades may be used. These achievable end hair colors are generated from the color prediction model and therefore more accurately represent the post-dyeing color of the recipient than the ordinary color charts frequently found on the back side of most hair coloring agent packaging (see FIG. 11). Block 200 recommends a particular hair coloring agent based on the selected achievable end hair colors, also referred to as desired hair color (see FIG. 12).

Hair Damage

Figure 16:
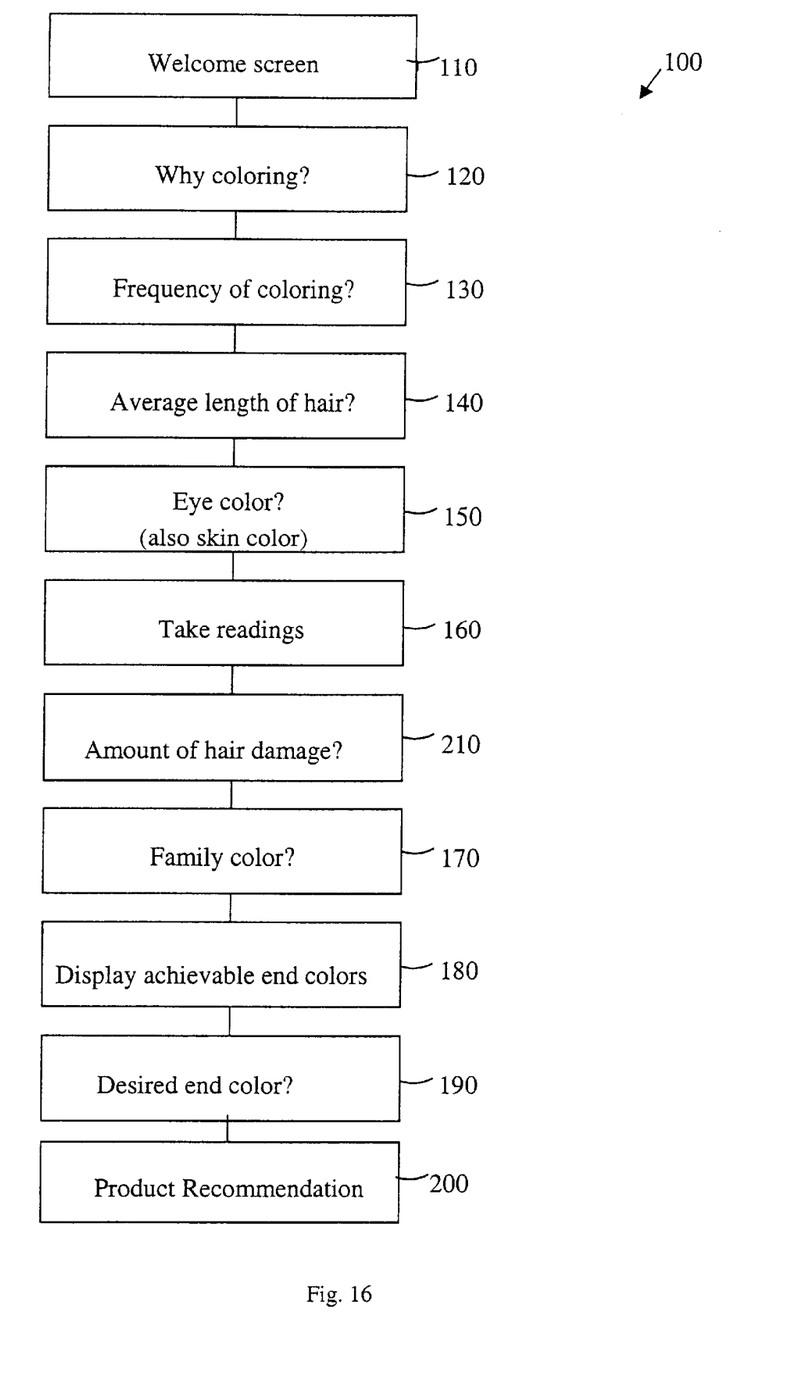
FIG. 16 is a block diagram of a color prediction method capable of utilizing the present invention, which includes a step for assessing hair damage.

Referring to FIG. 16, hair color analyzing method 100 may further contain one or more steps in which a starting hair value of a recipient may be a measure of damage to the hair of the recipient. Block 210 contains a screen which asks the recipient the degree of damage to their hair (see FIG. 17). The amount of damage to the hair may affect the hair's ability to be colored, as typically the more damaged the hair is, the lesser its ability to hold color due to changes in the structure of the cuticle. Again, it will be appreciated by those skilled in the art that the order in which the steps set forth in blocks 120 through 170, and block 210 are shown herein represent but one embodiment of the present invention, and that these steps may actually be performed in any order relative to one another.

Figure 17:
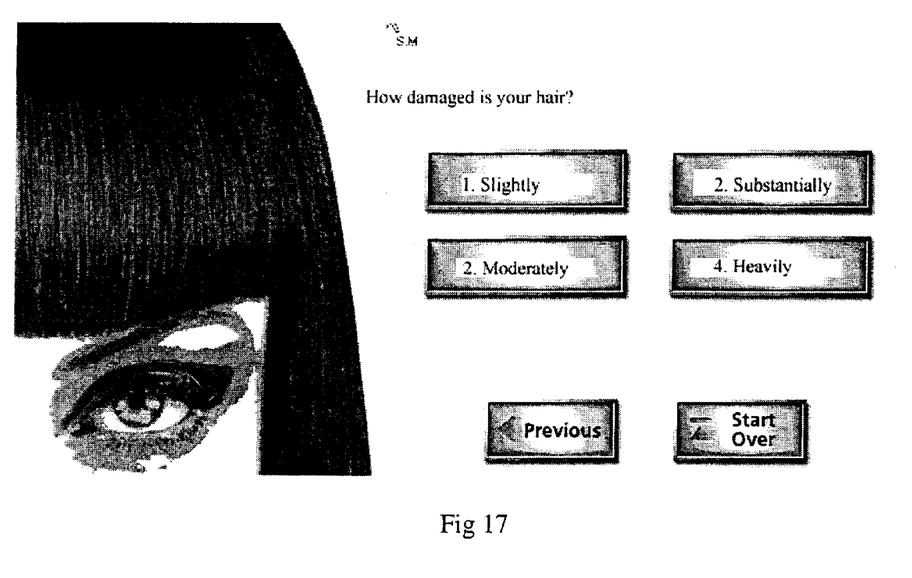
FIG. 17 is a screen shot of an input screen which may be used and is an example of block 210 within FIG. 16.

The degree of damage may be represented by such terms as shown in FIG. 17, i.e. "slightly, moderately, substantially, heavily," however, any words or a numbered grade scale or continuum points which depict increasing or decreasing quantities of damage may be used in the invention. The method of determining how much damage may include, but is not limited to: intuitive self-assessment by the recipient, visual or physical assessment by the recipient or another, such as a beauty counselor, assessment using a device which measures hair damage, chemical assessment of the hair, and combinations thereof. The method of determining hair damage may be conducted during the execution of method 100, or it may be conducted previously, and the result simply inputted during the execution of method 100.

Suitable hair damage measuring methods for use herein include, but are not limited to methods which employ devices that assess roughness, and by implication damage by measuring the degree of friction generated by subjecting the hair to certain conditions. For instance, ease of combing is commonly used as a measure of smoothness. In one combing test the force required to detangle, by drawing a comb through, a bundle of hair fibres is used to assess friction, roughness and damage. EP-A-965,834 describes friction-measuring equipment for evaluating the effects of cosmetics on skin, hair, membranes and eyes. This equipment assesses friction by means of deformation of a deformable assembly on a probe. JP 63/163143 measures the degree of damage to hair by comparing forward and reverse friction forces. These forces are measured by means of a torque meter. JP 62/273433 measures friction between hairs by passing a fluid in turbulent flow over a bundle of hair and measuring friction by detecting pressure loss in the fluid.

Also suitable for use herein is a device which utilizes a method for measuring the friction generated by a bundle of hair fibres, comprising providing a friction member, drawing the friction member through the bundle of hair, whereby a frictional noise signal is generated, and capturing the frictional noise signal by a noise sensor. Further, the captured noise signal may be converted to a form which can be displayed. The converted signal may then displayed using display means. In such a method, the friction generated by a bundle of the recipient's hair is measured using both a friction member and a noise sensor. The friction member may be drawn through the hair such that it contacts and passes over the surfaces of the individual hairs. This creates friction between the friction member and the hairs. The frictional noise generated depends upon the level of friction between the friction member and the hair surfaces. The friction member may be drawn through the hair of the recipient one or more times, and a statistical analysis may be performed to determine an average or mean value.

Such a friction member may generally formed from rigid material, and may be in the form of a comb means having a plurality of tines. The comb means is usually drawn through the bundle of hair in the manner usual for a comb. The frictional noise signal generated is captured by means of a frictional noise sensor, for example a microphone, which is, for instance, a standard electronic microphone or a noise cancelling microphone. Once the frictional noise has been captured it can be displayed and analysed in any suitable manner. It may be visually displayed to the recipient, who then selects a grade of damage based on the display, or it may be simply inputted directly into method 100, while also being displayed to the recipient. The frictional noise sensed by the sensor may be converted to a signal which is then transferred to the visual display unit and displayed, or it may, for instance, be displayed in the form of a trace of sound amplitude versus time. These conversions may be achieved using known means.

The degree of damage assessed by this method may be reported as a value indexed against predetermined categories for which standard degrees of hair damage have been measured and tabulated, or as a value of damage relative to a standard, or as an amount of damage as measured on a scale of decibel levels which correspond to particular degrees of damage, or may be reported as an absolute value as measured, or the like.

Suitable hair damage measuring methods for use herein also include, but are not limited to methods known in the art which chemically assess the amount of broken versus unbroken disulfide bonds of cystiene in the recipient's hair.

Color Prediction Models

Figure 13:
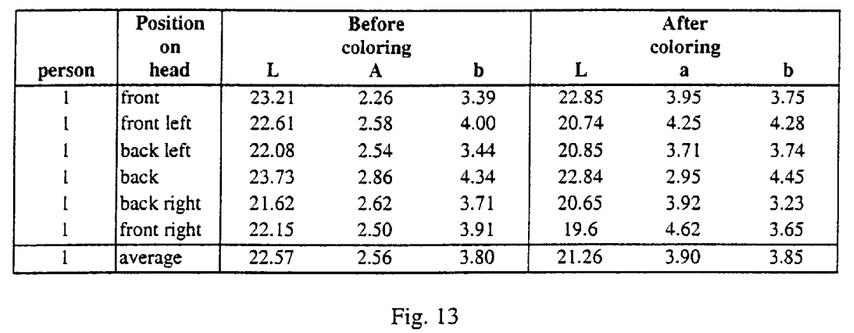
FIG. 13 is an example of a before and after data generated for a consumer using the Light Mahogany Brown shade.

In developing the color prediction models, consumers were recruited to participate in a hair colorant program at a salon. On arrival at the salon, a calorimeter was used to measure the initial color of the consumer's hair. Data generated were color readings expressed in the L, a, b color space. Multiple readings were taken at different parts of the head (e.g., front, front left, back left, back, back right and front right). An overall average color reading was calculated from these individual readings. After these initial readings were taken, the consumer's hair was colored using a shade selected by the consumer. After coloring and drying, the color of the hair was taken again using the colorimeter as outlined above. Thus data were generated for before and after coloring for a variety of shades on a number of consumers. An example of the data generated is provided in FIG. 13 for a consumer using the Light Mahogany Brown shade. There are slight differences between predicted hair color and that observed after coloring due to measurement error, modeling error and the natural variability in the data. Model accuracy as indicated by root mean square error (standard deviation of prediction) is in the region of 2.5 points for L, and 1 point for both a and b. This is in the region of natural variability within a head. Research has shown that in describing the color of their own hair empirically, consumers may be as much as 10 or 12 points out in terms of L. With this in mind, the prediction accuracy of the present invention is considered more than acceptable.

Color prediction models were then generated for each shade to predict achievable hair color after coloring versus initial color of the hair. Separate models were generated to predict L, a and b for each shade (Auburn, Light Mahogany Brown, Light Brown, Golden Chestnut, Dark Brown, Mid Copper Brown, Light Pearl Ash Blonde, Mist Beige Blonde, Rich Burgundy Red, Lightest Auburn Brown, Lightest Brown, Lightest Golden Brown, Soft Medium Brown, True Red, Warm Dark Brown and Soft Copper Blonde). Models for a and b contained linear effects for L, a and b. Models were generated using partial least squares regression. While the preferred embodiment contains the modeling strategy and technique discussed above, skilled in the art would readily appreciate that other modeling strategies and techniques may be used anywhere without departing from the scope of the present invention. An example of color prediction models generated for L, a and b for the Light Mahogany Brown shade is given below:

Predicted L=7.307+(0.5948×L before coloring)

Predicted a=0.0104+(0.0868×L before coloring)+(0.580×a before coloring)+(0.2085×b before coloring)

Predicted b=−3.3911+(0.2831×L before coloring)−(0.0190×a before coloring)+(0.3187×b before coloring)

Referring again to FIG. 1, Block 180 displays the achievable end colors from which the recipient will be prompted to select from in block 190, it is important to display the achievable end hair colors in the truest fashion, meaning, the color shown on the display screen should be substantially similar in the recipient's perception, to the color predicted by the color prediction model. There may, and likely will be, differences between the characteristics of the lighting under which a starting hair value, such as that obtained in block 160, and the characteristics of the lighting under which the achievable end colors are displayed in block 180. Further, the use of any CRT screen to display the achievable end colors will inherently cause some discrepancy between the display of the colors according to their L, a, and b values and the recipient's perceived view of them. To correct for these potential differences, block 180 may include one of more steps to adjust the color of the displayed image, and hence, its perception by the recipient (see FIG. 1).

Color adjustment

Referring to FIG. 1, block 180 of hair color analyzing method 100 may further contain one or more steps to correct for any differences between the characteristics of the lighting under which a starting hair value, such as that obtained in block 160, and the characteristics of the lighting under which the achievable end colors are displayed, (see block 180), and for the fact that use of any display screen inherently causes a difference in the recipient's perception. Applicants have found that as a result of both of these factors, i.e. lighting and use of a display screen, the recipient may find that the image displayed to them is duller or otherwise not consonant with how they would perceive their hair color, despite the fact that the L, a, b, values of the image being rendered are identical to their current hair color or achievable end hair color.

According to one method for determining the correcting factors for each shade that is suitable for use herein, one starts with any given shade. Then, a plurality of persons who have their hair colored to that shade may have their color measured (see block 160). While the image is displayed, one may adjust the L, a, b values of the displayed image until a referee who is able to discern when the color of the displayed image matches in perception, the color of the person's hair. The changes in L, a, b, respectively, may then be averaged across all persons tested. These values may then represent correcting factors.

Color Rendering Method

Figure 14:
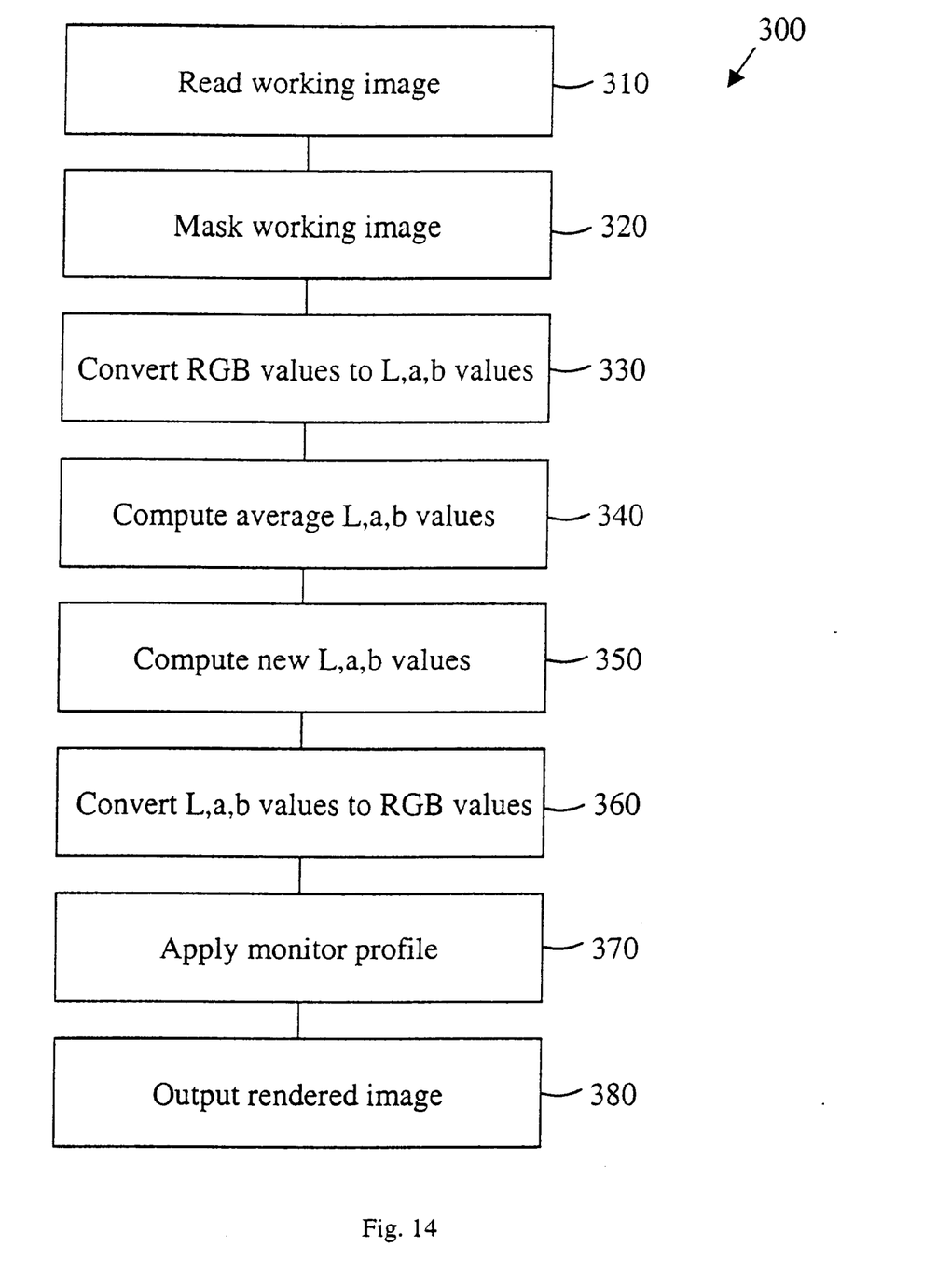
FIG. 14 is a block diagram of a color rendering method capable of utilizing the present invention.

Referring to FIG. 14, color rendering method 300 contains a series of steps that are intended to convert a working image into an image that may be rendered on a display screen. Many display screens display their colors using an RGB color format. Furthermore, each type of display screen may have a unique profile. To address these issues, the technique in FIG. 14 was developed. Method 300 begins with block 310 which reads a working image 315 (see FIG. 15) into the memory of a computer or any other similar electronic device. Block 320 then masks working image 315 to create masked image 325 (see FIG. 15). Masked image 325 separates the area containing hair from the area that does not hair. This masking step is helpful in that it identifies the area that only requires changing (i.e.: area containing hair), thus reducing computer processing time. The masking may be performed automatically or manually using a variety of masking techniques that are known throughout the industry. It may also be desired to mask other area such as eyes and skin so that these areas may be changed in response to eye and skin information supplied by the recipient in block 150. While the preferred embodiment uses the same working image 315 and the same masking image 325 for each recipient, skilled in the art would readily appreciate that other techniques may be used, including but not limited to, creating a working image from a picture of the recipient and then masking said image, without departing from the scope of the present invention. Block 330 converts the masked portion of working image 315 from RGB (Red-Green-Blue) color format to XYZ tristimulus values first and then converts them further into L, a, b colors. Block 340 computes the average L, a, and b color values of the hair portion of working image 315, said averaged values are defined below as "AverageImageColor_L", "AverageImageColor_a" and "AverageImageColor_b", respectively. Block 350 then computes new L, a, b values for each point (x,y) within the hair portion of working image 315, said new values are defined below as "NewImageColor_L", "NewImageColor_a" and "NewImageColor_b", respectively and are calculated as:

NewImageColor_L(x,y) CurrentImageColor_L(x,y)+ (DesiredColor_L−AverageImageColor_L)

NewImageColor_a (x,y)=CurrentImageColor_a (x,y)+ (DesiredColor_a−AverageImageColor_a)

NewImageColor_b (x,y)=CurrentImageColor_b (x,y)+ (DesiredColor_b−AverageImageColor_b)

wherein,

AverageImageColor_L, AverageImageColor_a and AverageImageColor_b are the computed averages just discussed.

NewImageColor_L(x,y), NewImageColor_a (x,y) and NewImageColor_b (x,y) are the new computed values for the point (x,y) being edited.

CurrentImageColor_L(x,y), CurrentImageColor_a (x,y) and CurrentImageColor_b (x,y) are the original color values for the point (x,y) being edited.

DesiredColor_L, DesiredColor_a and DesiredColor_b are the color values for the desired achievable color that was selected in Block 190.

Once each point (x,y) within the hair portion of working image are converted as described above, the resulting image will have an average L, a, and b of DesiredColor_L, DesiredColor_a and DesiredColor_b, respectively.

This can be easily demonstrated by summing up all (x,y) points within the hair portion and dividing by the total within the hair portion as shown below for L.

SUM[NewImageColor_L(x,y)]=SUM [CurrentImageColor_L(x,y)]+SUM[(DesiredColor_ L−AverageImageColor_L)]

But, SUM over all the (x,y) points is equal to the Average multiplied by the total number. If the total number of points within the hair portion is N, then AverageNewImageColor_L*N= AverageCurrentImageColor_L*N+SUM (DesiredColor_L)−SUM (AverageImageColor_L)

AverageNewImageColor_L*N= AverageCurrentImageColor_L*N+DesiredColor_ L*N−AverageImageColor_L*N Now, AverageImageColor_L*N will cancel out leaving AverageNewImageColor_L*N=DesiredColor_L*N That is, AverageNewImageColor_L=DesiredColor_L Block 360 converts the NewImageColor L, a, b values back to RGB so that they may be displayed on the display screen which uses RGB format. They may also be converted into sRGB values. This conversion is accomplished by first converting the NewImageColor L, a, b values to XYZ tristimulus values and then converting them further into RGB colors. Block 370 then applies the particular monitor profile for the particular display screen being used so that the NewImageColor L, a, b values are displayed as they were intended to look. This procedure for applying a particular monitor profile is described in ICC Profile API Suite Version 2.0-Professional Color Management Tools, Eastman-Kodak Company, 1997, and as such is herein incorporated by reference. Block 380 outputs rendered image 335 (see FIG. 15). The output includes, but is not limited to, display on a display screen, printing, saving on disk, or transmitting the image to another.

Example of color rendering method 300 and color adjustment

This example illustrates how to render a person's achievable color for Light Mahogany Brown shade using color rendering method 300. A color adjustment is also illustrated.

For Light Mahogany Brown shade, the color adjustment factors were determined to be +5 for L, +2 for a, and +5 for b. Accordingly, the predicted colors must be modified as follows:

Desired L=Predicted L+5

Desired a=Predicted a+5

Desired b=Predicted b+2

Assume six CIE Lab color readings of the person's hair have been made and that the average CIE Lab color is (14.16, −5.06, 4.54). According to the prediction model for Light Mahogany Brown color, the achievable output color will be:

Predicted L=7.307+(0.5948×14.16)=15.73

Predicted a=0.0104+(0.0868×14.16)+(0.580×−5.06)+(0.2085×4.54)=−0.75

Predicted b=−3.3911+(0.2831×14.16)−(0.0190×−5.06)+(0.3187×4.54)=2.16

Next, the predicted values are modified according to the color adjustment values for Light Mahogany Brown, as shown:

Desired L=15.73+5=20.73

Desired a=−0.75+5=4.25

Desired b=2.16+2=4.16

So, the function of color rendering method 300 is to read an image and recreate a new image that will have an average L, a, b hair color value of (20.73, 4.25, 4.16).

Figure 15:
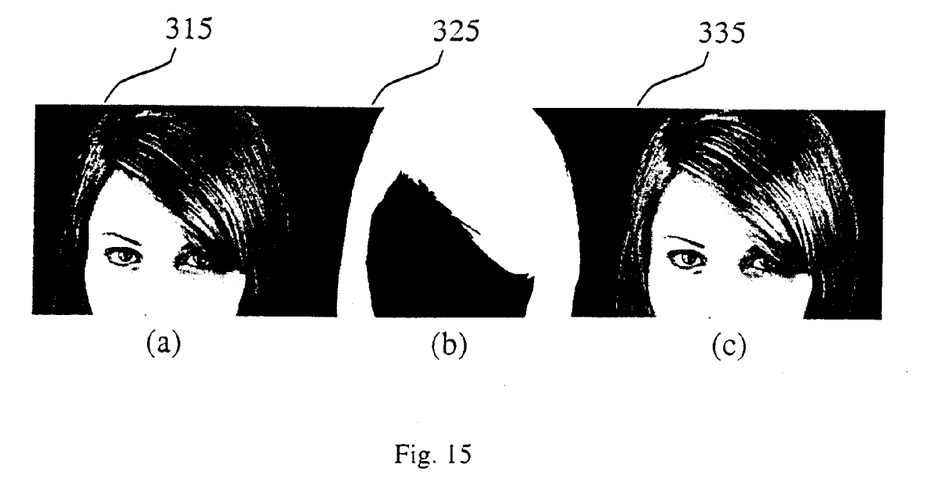
FIG. 15 is an example of (a) working image before rendering, (b) masking image of the working image, and (c) a rendered image created using the present invention.

Next, according to blocks 310 and 320, the working image is read, and then masked, wherein these images are typical to the ones shown in FIG. 15.

Next, according to block 330, the image will then be converted from Red-Green-Blue to CIE Lab color. Assume image consists of 640×480 (=307200) points with each point having three values—one each for Red, Green, and Blue. At this step, for every point in the image, the Red, Green, Blue values will first be converted to three XYZ tristimulus values according to following equations:

r=Red/255.0 g=Green/255.0 b=Blue/255.0 if (r<or=0.03928), then r=r/12.92, else r=((r+0.055)/1.055)$^{2.4}$ if (g<or=0.03928), then g=g/12.92, else g=((g+0.055)/1.055)$^{2.4}$ if (b<or=0.03928), then b=b/12.92, else b=((b+0.055)/1.055)$^{2.4}$ X=(0.4124*r+0.3576*g+0.1805*b)

Y=(0.2126*r+0.7152*g+0.0722*b)

Z=(0.0193*r+0.1192*g+0.9505*b)

Then the three XYZ tristimulus values are converted to the CIE Lab values according to the equations given below.

Xnorm=X/0.95

Ynorm=Y/1.0

Znorm=Z/1.09 if (Ynorm>0.008856), then fY=Ynorm$^{1/3}$ and L=116.0*fY−16.0 else L=903.3*Ynorm if (Xnorm>0.008856), then fX=Xnorm,$^{1/3}$ else fX=7.787*Xnorm+16/116 if (Znorm>0.008856), then fZ=Znorm$^{1/3}$ else fZ=7.787*Znorm+16/116 a=500*(fX−fY)

b=200*(fY−fZ)

For example, for an image point with a Red, Green, Blue values of (198, 130, 111), these equations will yield CIE Lab values of (60.1, 24.1, 21.1).

Next, according to block 340, average values for L, a, and b, will be computed. At this stage, the image will have all (i.e. 640×480=307200) its points converted from Red, Green, Blue values to CIE L, a, b values. For all the points within the area containing hair, average L, a, b values are computed by routine math (i.e.: sum/# of points). For purposes of this example, it is assumed that the average L, a, b vales are (26.7, 10.1, 15.2).

Next, according to block 350, new L, a, and b values will be computed. Each point within the area of the image containing hair is changed according to the equations discussed above in block 350. Assuming average L, a, b vales of (26.7, 10.1, 15.2) and current point color values of (59.3, 30.4, 18.4), to obtain a new image with average L, a, b color values of (20.73, 4.25, 4.16) as predicted for Light Mahogany Brown, the new L, a, b color values for this specific point will be changed to:

New L=59.3+(20.73−26.7)=53.33

New a=30.4+(4.25−10.1)=24.55

New b=18.4+(4.16−15.2)=7.36

Once all the points in the image within the area containing hair have been converted according to the above technique, new image (i.e.: rendered image) will have an average L, a, b color value of (20.73, 4.25, 4.16), which is the predicted (i.e.: desired) color for Light Mahogany Brown.

Next, according to block 360, the L, a, and b values will be converted to RGB values. At this stage, the new image which is in L, a, b format (e.g., CIE Lab) must be converted back into RGB (Red, Green, and Blue) format. This procedure is accomplished by first converting L, a, b values into three XYZ tristimulus, and then converting the three XYZ tristimulus values into RGB values. This procedure may be accomplished by the following technique:

Lplus16By25=(L+16.0)/25.0

CubeRootOf1By100=0.21544 fX=a/500.0+CubeRootOf1By100*Lplus16By25 fY=Lplus16By25 fZ=CubeRootOf1By100*Lplus16By25−(b/200.0)

Xnorm=0.95*fX$^{3.0}$

Ynorm=1.0*fY$^{3.0}$/100.0;

Znorm=1.09*fZ$^{3.0}$ r=(3.2410*Xnorm−1.5374*Ynorm−0.4986*Znorm)

g=(−0.9692*Xnorm+1.8760*Ynorm+0.0416*Znorm)

b=(0.0556*Xnorm−0.2040*Ynorm+1.0570*Znorm)

if (r<=0.00304), then r=12.92*r, else r=1.055*r$^{1.0/2.4}$−0.055 if (g<=0.00304), then g=12.92*g, else g=1.055*$g^{1.0/2.4}$−0.055 if (b<=0.00304), then b=12.92*b, else b=1.055*$b^{1.0/2.4}$−0.055

Red=255.0*r

Green=255.0*g

Blue=255.0*b

For example, for an image point with L, a, b values of (60.89, 24.08, 21.12) these equations will yield Red, Green, Blue values of (198, 130, 111).

End of Example

The present invention may be implemented, for example, by using the Minolta CR300 Colorimeter and NCR touchscreen Kiosk 7401, comprising a computer system and touchscreen display.

The present invention may be implemented, for example, by operating a computer system to execute a sequence of machine-readable instructions. These instructions may reside in various types of signal bearing media, such hard disk drive and main memory. In this respect, another aspect of the present invention concerns a program product, comprising signal bearing media embodying a program of machine-readable instructions, executable by a digital data processor, such as a central processing unit (CPU), to perform method steps. The machine-readable instructions may comprise any one of a number of programming languages known in the art (e.g., Visual Basic, C, C++, etc.).

It should be understood that the present invention may be implemented on any type of computer system. One acceptable type of computer system comprises a main or central processing unit (CPU) which is connected to a main memory (e.g., random access memory (RAM)), a display adapter, an auxiliary storage adapter, and a network adapter. These system components may be interconnected through the use of a system bus.

The CPU may be, for example, a Pentium Processor made by Intel Corporation. However, it should be understood that the present invention is not limited to any one make of processor and the invention may be practiced using some other type of a processor such as a coprocessor or an auxiliary processor. An auxiliary storage adapter may be used to connect mass storage devices (such as a hard disk drive) to a computer system. The program need not necessarily all simultaneously reside on the computer system. Indeed, this latter scenario would likely be the case if computer system were a network computer, and therefore, be dependent upon an on-demand shipping mechanism for access to mechanisms or portions of mechanisms that resided on a server. A display adapter may be used to directly connect a display device to the computer system. A network adapter may be used to connect the computer system to other computer systems.

It is important to note that while the present invention has been described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media, such as floppy disks, hard disk drives, and CD ROMs and transmission type media, such as digital and analog communications links and wireless.

While particular embodiments of the present invention have been illustrated and described, it will be obvious to those skilled in the art that various changes and modifications may be made without departing from the scope of the invention.

What is claimed is:

1. A personalized method for identifying an achievable end hair color based upon at least one starting hair value of a recipient, said method comprising the steps of:

a) inputting at least one starting hair value of a recipient; and b) identifying at least one achievable end hair color based upon said starting hair value; wherein said identifying of an achievable end hair color is performed by a color prediction algorithm and further wherein said color prediction algorithm calculates said achievable end hair color using a color model generated by using a partial least squares regression technique of said at least one starting hair value.

2. The method of claim 1, wherein said starting hair value is calculated from the group consisting of values representing the reason the recipient is coloring their hair, how damaged the recipient's hair is, what the eye and skin color of recipient are, what color recipient's hair is, and combinations thereof.

3. The method of claim 2, wherein the color of recipient's hair is indicated using values selected from the group consisting of Hunter L, a, b color values, and Commission International de l'Eclairage L, a, b color values.

4. The method of claim 2, wherein the color of recipient's hair is measured by a colorimeter or a spectrophotometer.

5. The method of claim 2, wherein the recipient's hair damage is indicated using values selected from the group consisting of values representing:

a) the recipient's hair average hair length, b) the frequency with which the recipient colors their hair, c) the amount of damage determined by a method selected from the group consisting of:

i. intuitive self-assessment by the recipient, ii. visual or physical assessment by the recipient or another, iii. assessment using a device which measures hair damage, iv. chemical assessment of the recipient's hair, and v. combinations thereof; and d) combinations thereof.

6. The method of claim 1, further comprising the step of outputting at least one working image depicting the achievable end hair color, wherein the recipient may select said working image as a desired end hair color.

7. A The method of claim 6, wherein the L, a, b color values of said achievable end hair color are adjusted to correct for differences between the actual achievable end hair color and the recipient's perception of the displayed achievable end hair color.

8. The method of claim 6, further comprising the step of recommending a hair coloring agent to achieve said desired end hair color.

9. The method of claim 6, wherein said working image is outputted to a display screen selected from the group consisting of a computer screen, a cathode ray tube device, and a liquid crystal display device.

10. The method of claim 1, wherein said steps are contained within a computer system or within a computer-readable medium or within a computer data signal embedded in a carrier wave.

11. A personalized method for identifying a hair coloring agent based upon at least one starting hair value of a recipient, said method comprising the steps of:

a) inputting at least one starting hair value of a recipient;

b) inputting a family color selection; and c) outputting at least one working image depicting an achievable end hair color based upon said starting hair value and said family color selection, wherein said outputting of at least one working image depicting an achievable end hair color is performed by a color prediction algorithm and further wherein said color prediction algorithm calculates said achievable end hair color using a color model generated by using a partial least squares regression technique of said at least one starting hair value.

12. The method of claim 11, further comprising the step of inputting of a selection of said achievable end hair color and recommending a hair coloring agent to achieve said selection.

* * * * *